United States Patent

Matsuo

[11] Patent Number: 5,804,645
[45] Date of Patent: Sep. 8, 1998

[54] RUBBER COMPOSITIONS OF TIRE TREAD

[75] Inventor: Toshiro Matsuo, Kakogawa, Japan

[73] Assignee: Sumitomo Rubber Industries, Ltd., Hyogo-ken, Japan

[21] Appl. No.: 936,433

[22] Filed: Sep. 24, 1997

Related U.S. Application Data

[62] Division of Ser. No. 156,710, Nov. 24, 1993, abandoned.

[30] Foreign Application Priority Data

Nov. 26, 1992 [JP] Japan ................................. 4-317193

[51] Int. Cl.$^6$ ....................................................... C08L 9/00
[52] U.S. Cl. ........................... 524/575; 524/127; 524/280; 524/394; 525/237; 152/209 R
[58] Field of Search ..................................... 524/424, 394, 524/496, 575, 127, 280; 525/237; 152/209 R

[56] References Cited

U.S. PATENT DOCUMENTS

| | | | |
|---|---|---|---|
| 4,065,426 | 12/1977 | Yamawaki et al. | 524/566 |
| 4,160,752 | 7/1979 | Akiyama et al. | 524/274 |
| 4,226,945 | 10/1980 | Bücken et al. | 521/92 |
| 4,330,592 | 5/1982 | Tsukamoto et al. | 428/378 |
| 4,826,907 | 5/1989 | Murao et al. | 524/394 |
| 4,963,615 | 10/1990 | Yuto | 524/496 |
| 5,001,176 | 3/1991 | Nakazima | 524/48 |
| 5,011,875 | 4/1991 | Yamamoto et al. | 524/45 |
| 5,229,459 | 7/1993 | Sandstrom et al. | 525/136 |

FOREIGN PATENT DOCUMENTS

| | | |
|---|---|---|
| 0346147A3 | 12/1989 | European Pat. Off. . |
| 2726039 | 12/1977 | Germany . |
| 2103625 | 2/1983 | United Kingdom . |

OTHER PUBLICATIONS

Database WPI, Derwent Publication Ltd., Week 9203, AN 019219 & JP–A–3 266 706 (11/91) (abstract).

*Primary Examiner*—Mark L. Warzel
*Attorney, Agent, or Firm*—Birch, Stewart, Kolasch & Birch, LLP

[57] ABSTRACT

A rubber composition of tire tread, which comprises an emulsion-polymerized styrene-butadiene rubber with a bonded styrene content of not less than 40% by weight which is contained in an amount of 10 to 100% by weight in a rubber component, and a sodium-containing basic inorganic compound and/or a basic sodium salt of organic acid which is blended in an amount of 0.5 to 5.0 parts by weight per 100 parts by weight of the rubber component. Safe driving at a high speed can be realized by using the rubber compositions.

16 Claims, No Drawings

RUBBER COMPOSITIONS OF TIRE TREAD

This application is a divisional of application Ser. No. 08/156,710, filed on Nov. 24, 1993, now abandoned, the entire contents of which are hereby incorporated by reference.

FIELD OF THE INVENTION

The present invention relates to a rubber compositions of tire tread, which can improve the steering stability of high performance tires for passenger cars, particularly sports cars, and can ensure safety during high speed driving.

BACKGROUND ARTS

Recently, in advances with high performance of tires for passenger cars, it has been demanded for tires to drive safely at a high speed. This calls for an intensive requirement for improved properties of tire treads. Particularly, the requirements for such tire treads are directing to gripping against road surface (grip property; being capable of responding at high speed driving), and high abrasion resistance.

Until now, in order to satisfy both grip properties and abrasion resistance, reinforcing characteristics of carbon black have been improved, for example, by enlarging specific surface area of carbon black particles (using carbon black with a smaller diameter), and by making their flocculats (structures) larger. For ensuring the safety during high speed driving, a high grip property at high speed driving has been obtained by using a styrene-butadiene rubber (hereinafter referred to as "SBR") with a high bonded styrene content, as a rubber material for a rubber component used for tire tread part.

When using a SBR with a high bonded styrene content and a highly reinforcable carbon black, a high grip property can be obtained. However, the use thereof increases an amount of heat generation of the tread part to soften the tread rubber due to the heat generated during driving, which makes the rigidity of the tread part lower and then, renders the steering stability unstable.

An object of the present invention is to provide rubber compositions of tire tread which can ensure safety during high speed driving, by preventing the lowering of rigidity of the tread part due to the heat generation of the tread rubber, and the lowering of steering stability.

As a result of the inventor's intensive research, it has been found that the specific sodium-containing inorganic compounds and/or sodium salts of organic acids have the ability to prevent the lowering of physical properties of the tread rubbers in the heat-generated state of tires, i.e. at a high temperature.

SUMMARY OF THE INVENTION

According to the present invention, there can be provided a rubber composition of tire tread, which comprises an emulsion-polymerized SBR with a bonded styrene content of not less than 40% (percent by weight; hereinafter the same, unless otherwise noted) which is contained in an amount of 10 to 100% in a rubber component, and a sodium-containing basic inorganic compound and/or a basic sodium salt of organic acid which is blended in an amount of 0.5 to 5.0 parts (parts by weight; hereinafter the same, unless otherwise noted) per 100 parts of the rubber component.

DISCLOSURE OF THE INVENTION

The rubber composition of the present invention may be prepared by blending, per 100 parts of the rubber component, 0.5 to 5.0 parts of the sodium-containing basic inorganic compound and/or the basic sodium salt of organic acid, carbon black, and other usual components which are generally blended with rubber compositions.

In the rubber component, the emulsion-polymerized SBR with the bonded styrene content of not less than 40%, preferably 40 to 50% is contained in an amount of 10 to 100%, preferably 20 to 100%, most preferably 50 to 100%. When the amount of the emulsion-polymerized SBR with the bonded styrene content of not less than 40% is smaller than 10% or the bonded styrene content is smaller than 40%, the grip property tends to be worse.

The rubber component may contain, other than the emulstion-polymerized SBR with the bonded styrene content of not less than 40%, a synthetic rubber, a natural rubber, or a mixture thereof. Examples of the synthetic rubber are, for instance, a SBR having silicon atom or tin-butadienyl bond and being prepared in a hydrocarbon solution in the presence of an organic lithium compound (so-called "solution-polymerized SBR"), an emulsion-polymerized SBR with the bonded styrene content of less than 40%, butadiene rubber (BR), isoprene rubber (IR), butyl rubber (IIR), halogenated butyl rubber, and the like.

The bonded styrene content is measured according to the following method. About 5 ml of a sample which is ground as finely as possible is put into a beaker which is charged with about 100 ml of isopropyl alcohol to coagulate the finely ground sample. The coagulant is taken out and washed with isopropyl alcohol, and then the remaining alcohol is removed by clamping between filter paper sheets. The coagulant is put in 50 ml of a mixed solvent of toluene (90 parts by volume) and isopropyl alcohol (10 parts by volume), and is heated on a hot plate of 80° to 100° C. for 5 minutes. The obtained rubber solution is pored into isopropyl alcohol, and the precipitate is washed several times with isopropyl alcohol, then dried for one hour in a reduced pressure dryer of 100° C. under a vacuum of 24 to 25 mm Hg. The subsequent procedures are carried out according to JIS K 6383 (Testing Methods for Synthetic Rubber SBR). A bonded styrene content is calculated from a measured refractive index.

Both the sodium-containing inorganic compound and the sodium salt of organic acid are basic compound which show a basicity pH of approximate 9 to 14 when a 1N aqueous solution is measured. Examples of the sodium-containing inorganic compound are, for instance, sodium hydrogencarbonate, anhydrous sodium carbonate, sodium hydroxide, sodium polyphosphate, sodium metaphosphate and an admixture thereof. Compounds which contain sodium but are not basic such as sodium sulfate, sodium thiosulfate, sodium nitrate and sodium chloride are excluded. Sodium hydrogencarbonate is especially preferable in view of its less bad influences on human bodies, and since sodium hydrogencarbonate has a low basicity and is effective for preventing the lowering of physical properties of the tread rubbers in the heat-generated state of tires. Examples of the sodium salt of organic acid are, for instance, sodium acetate, sodium propinate, sodium butyrate, sodium benzoate, sodium oleate, sodium alginate, sodium carboxymethyl cellulose, and an admixture thereof. Sodium benzoate is especially preferable in view of its excellent reactivity with rubbers. The sodium-containing inorganic compound and the sodium salt of organic acid may be used in combination.

The sodium-containing inorganic compound and/or the sodium salt of organic acid (hereinafter they may be referred to as "sodium-containing compound") is blended in an amount of 0.5 to 5.0 parts, preferably 0.5 to 4.0 parts, more preferably 1.0 to 4.0 parts per 100 parts of the rubber component. When the amount of the sodium-containing compound is less than 0.5 part, there is a tendency that the effect of preventing the lowering of physical properties at a high temperature cannot be obtained. When more than 5 parts, the sodium-containing compound tends to be ununiformly dispersed and the resulting rubber composition tends to be inferior in abrasion resistance and crack resistance.

As the carbon black, there may be used, for example, a furnace black which is usually utilized for reinforcing rubbers.

In the rubber compositions of tire tread of the present invention, it is preferable that the carbon black is one which has an average particle size of not more than 25 nm (namely carbon blacks of ISAF or SAF, or a higher class), and that the carbon black is blended in an amount of not less than 70 parts per 100 parts of the rubber component. In the present invention, the average particle size is number average particle size and measured by using a transmission electron microscope. For example, when a carbon black which has an average particle size of more than 25 nm (a carbon black so-called HAF or a lower class) is used alone, the required grip property cannot be obtained. Examples of the carbon black which has average particle size of not more than 25 nm are, for instance, ISAF (having an average particle size of 20 to 25 nm) or SAF (having an average perticle size of 11 to 19 nm), a fine carbon black having an average particle size of not more than 10 nm which belongs to a hard region of a smaller average particle size, and the like. The amount of the carbon black is more preferably 70 to 110 parts, most preferably 80 to 110 parts per 100 parts of the rubber component. When the amount of such carbon black is less than 70 parts, there is a tendency that a high grip property cannot be obtained.

As the other usual components, there may be used additives which are used in rubber kneading in usual production processes of tire treads, namely, vulcanizing agents, vulcanization accelerators, vulcanizing aids, rubber antioxidants, process oils and the like. Their blending amounts are not specifically restricted but within ranges which do not obstruct the purpose of the present invention.

The rubber composition of tire tread of the present invention is prepared, usually, first by base-kneading the rubber component, the sodium-containing compound and the additives other than the vulcanizing agent and the vulcanization accelerator, with a banbury mixer, then admixing thereto the valucanizing agent and the valcanization accelerator with rolls or a banbury mixer.

Thus prepared rubber composition of tire tread is extruded in a given form. After molding, a tread is produced by vulcanization. A tire having characteristic features regarding the rubber composition of the tire tread of the present invention can be obtained by a usual production process of tires.

The present invention is more specifically described and explained by means of the following Examples. The present invention, however, is not limited to the following Examples.

EXAMPLE 1

A rubber composition of tire tread was prepared by base-kneading a mixture of 137.5 parts (37.5 parts of an aromatic oil is extended) of an emulsion-polymerized SBR (available from Nippon Zeon Co., Ltd.) (referred to as SBR (A) in the following tables), 80.0 parts of a carbon black N110 (having an average particle size of 18 nm), 0.5 part of sodium hydrogencarbonate, 2.0 parts of Sunnoc Wax, 2.0 parts of a rubber antioxidant 6c (N-phenyl-N'-(1,3-dimethylbutyl)-p-phenylenediamine), 2.0 parts of stearic acid and 3.0 parts of zinc oxide with a BR type banbury mixer (having a volume of 1.8 liters; available from Kobe Steel, Ltd.) for four minutes, and subsequently admixing 2.0 parts of sulfur and 1.0 part of a vulcanization accelerator CZ with a eight inches roll (available from Osaka Roll Kabushiki Kaisha).

The resulting rubber composition of tire tread was shaped into a rubber sheet having a thickness of 2 to 3 mm with the above-mentioned roll. These rubber sheets were laminated to form a extrusion type tread. A steel radial tire (having a size of 225/50R16) was made by using the tread rubber of the extrusion type.

The above-mentioned rubber composition of the tire tread and the tire were tested as reported in the following items. The results are shown in Table 1.

Viscoelasticity (E*)

The rubber composition was vulcanized at a temperature of 170° C. for 15 minutes, and shaped into a test specimen having a thickness of 2 mm and a width of 4 mm.

Viscoelasticities E* at 50° C. and at 90° C. of the test specimen are measured respectively under conditions of an initial elongation of 10%, a dynamic strain of 0.5% and a vibration frequency of 10 Hz with a viscoelastic spectrometer (available from Kabushili Kaisha Iwamoto Seisakusho). Also, a ratio of E* at 90° C. to E* at 50° C. was calculated.

Chemicals dispersibility

The rubber composition was vulcanized at a temperature of 170° C. for 15 minutes. A small chip of the resulting rubber was cut out and sliced into a thin film by a microtome (type 1400, available from LEITZ). Chemicals dispersibility was evaluated by observing the thin film with a microscope.

Actual car test

The steel radial tires made in the same manner as disclosed above were attached to a domestic 3000 cc passenger car. A steering stability and response property of the actual car and a grip limit height of the actual car were tested on the Okayama testing course of Sumitomo Rubber Industries, Ltd. with two passengers. The results of sensory evaluations are represented as an index to the blank value (100) of Comparative example 1 in which no sodium-containing compound is blended. The grip limit height of the actual car was evaluated by running the car on an asphalt road circularly at a radius of 40 m and measuring a speed at which the circle having a radius of 40 m cannot be traced by the car even if the driver tries to maintain the circle by turning the steering wheel.

EXAMPLES 2 to 3 AND COMPARATIVE EXAMPLES 1 to 3

Rubber compositions of tire tread were prepared in the same manner as in Example 1 by using the same blend as that of Example 1 except that sodium hydrogencarbonate in a powder or a granular state was used in the respective amounts described in Table 1. Steel radial tires were made in the same manner as in Example 1 by using these rubber compositions of tire tread.

The same tests as in Example 1 were carried out with respect to the resulting rubber compositions of tire tread and tires. The results are shown in Table 1.

TABLE 1

|  | Comparative Example 1 | Comparative Example 2 | Example 1 | Example 2 | Example 3 | Comparative Example 3 |
|---|---|---|---|---|---|---|
| SBR (A) [*1] | 137.5 | 137.5 | 137.5 | 437.5 | 137.5 | 137.5 |
| Carbon black N110 | 80.0 | 80.0 | 80.0 | 80.0 | 80.0 | 80.0 |
| Sodium hydrogencarbonate | — | 0.3 | 0.5 | 2.0 | 5.0 | 10.0 |
| E* @50° C. | 210 | 212 | 221 | 214 | 216 | 221 |
| E* @90° C. | 90 | 97 | 111 | 113 | 116 | 117 |
| E* @90° C./E* @50° C. | 0.43 | 0.46 | 0.50 | 0.53 | 0.54 | 0.53 |
| Chemicals dispersibility | — | good | good | good | Slightly bad | bad |
| Steering stability and response property of actual car | 100 | 100 | 105 | 108 | 110 | 109 |
| Grip limit height of actual car | 100 | 100 | 100 | 101 | 100 | 100 |

EXAMPLES 4 to 5 AND COMPARATIVE EXAMPLE 4

Rubber compositions of tire tread were prepared in the same manner as in Example 1 by using the same blend as that of Example 2 except that the rubber component was changed as shown in Table 2. In Table 2, SBR (A) is an emulsion-polymerized SBR with a bonded styrene content of 45% (available from Nippon Zeon Co., Ltd.), SBR (B) is an emulsion-polymerized SBR with a bonded styrene content of 40% (available from Nippon Zeon Co., Ltd.), SBR (C) is an emulsion-polymerized SBR with a bonded styrene content of 35% (available from Nippon Zeon Co., Ltd.), SBR (D) is a solution-polymerized SBR with a bonded styrene content of 29% and a vinyl content of 39% by mole (available from Nippon Zeon Co., Ltd.). Steel radial tires were made in the same manner as in Example 1 by using these rubber compositions of tire tread.

The same tests as in Example 1 were carried out with respect to the resulting rubber compositions of tire tread and tires. The results are shown in Table 2.

TABLE 2

|  | Example 4 | Comparative Example 4 | Example 5 |
|---|---|---|---|
| SBR (A) [*1] |  |  | 27.5 |
| SBR (B) [*2] | 137.5 |  |  |
| SBR (C) [*3] |  | 137.5 |  |
| SBR (D) [*4] |  |  | 110.0 |
| Carbon black N110 | 80.0 | 80.0 | 80.0 |
| Sodium hydrogencarbonate | 2.0 | 2.0 | 2.0 |
| E* @50° C. | 225 | 230 | 226 |
| E* @90° C. | 116 | 122 | 124 |
| E* @90° C./E* @50° C. | 0.52 | 0.53 | 0.55 |
| Chemicals dispersibility | good | good | good |
| Steering stability and response property of actual car | 109 | 108 | 108 |
| Grip limit height of actual car | 98 | 92 | 99 |

[*1] Emulsion-polymerized SBR with a bonded styrene content of 45%
[*2] Emulsion-polymerized SBR with a bonded styrene content of 40%
[*3] Emulsion-polymerized SBR with a bonded styrene content of 35%
[*4] Solution-polymerized SBR with a bonded styrene content of 27% and a vinyl content of 39% by mole
All for SBR containing 37.5 parts of extending oils per 100 parts of the polymer

EXAMPLES 6 to 7 AND COMPARATIVE EXAMPLES 5 to 9

Rubber compositions of tire tread were prepared in the same manner as in Example 1 by using the same blend as that of Example 2 except that sodium hydrogencarbonate was changed to the inorganic compounds shown in Table 3. Steel radial tires were made in the same manner as in Example 1 by using these rubber compositions of tire tread.

The same tests as in Example 1 were carried out with respect to the resulting rubber compositions of tire tread and tires. The results are shown in Table 3.

TABLE 3

|  | Example 6 | Example 7 | Comparative Example 5 | Comparative Example 6 | Comparative Example 7 | Comparative Example 8 | Comparative Example 9 |
|---|---|---|---|---|---|---|---|
| SBR (A) | 137.5 | 137.5 | 137.5 | 137.5 | 137.5 | 137.5 | 137.5 |
| Carbon black N110 | 80.0 | 80.0 | 80.0 | 80.0 | 80.0 | 80.0 | 80.0 |
| Anhydrous sodium carbonate | 2.0 |  |  |  |  |  |  |
| Sodium hydroxide |  | 2.0 |  |  |  |  |  |
| Magnesium carbonate |  |  | 2.0 |  |  |  |  |
| Calcium carbonate |  |  |  | 2.0 |  |  |  |
| Sodium sulfate |  |  |  |  | 2.0 |  |  |
| Sodium thiosulfate |  |  |  |  |  | 2.0 |  |
| Sodium nitrate |  |  |  |  |  |  | 2.0 |
| E* @50° C. | 221 | 183 | 188 | 185 | 163 | 159 | 169 |
| E* @90° C. | 120 | 107 | 92 | 89 | 81 | 78 | 80 |
| E* @90° C./E* @50° C. | 0.54 | 0.58 | 0.49 | 0.48 | 0.50 | 0.49 | 0.47 |

TABLE 3-continued

|  | Example 6 | Example 7 | Comparative Example 5 | Comparative Example 6 | Comparative Example 7 | Comparative Example 8 | Comparative Example 9 |
|---|---|---|---|---|---|---|---|
| Chemicals dispersibility | good | good | good | good | bad | bad | bad |
| Steering stability and response property of actual car | 109 | 112 | 102 | 98 | 96 | — | — |
| Grip limit height of actual car | 101 | 99 | 100 | 99 | 98 | — | — |

EXAMPLES 8 to 12

Rubber compositions of tire tread were prepared in the same manner as in Example 1 by using the same blend as that of Example 2 except that the rubber component, the carbon black and the aromatic oil were blended as shown in Table 4. The carbon black N110 has an average particle size of 18 nm, the carbon black N220 has an average particle size of 22 nm, and the carbon black N330 has an average particle size of 28 nm. Steel radial tires were made in the same manner as in Example 1 by using these rubber compositions of tire tread.

The same tests as in Example 1 were carried out with respect to the resulting rubber compositions of tire tread and tires. The results are shown in Table 4.

TABLE 4

|  | Example 8 | Example 9 | Example 10 | Example 11 | Example 12 |
|---|---|---|---|---|---|
| SBR (A) | 137.5 | 110.0 | 110.0 | 110.0 | 110.0 |
| Natural rubber |  | 20.0 |  |  |  |
| BR |  |  | 20.0 | 20.0 | 20.0 |
| Carbon black N110 *1 |  | 80.0 | 80.0 |  |  |
| Carbon black N220 *2 | 80.0 |  |  | 110.0 | 70.0 |
| Carbon black N330 *3 |  |  |  |  |  |
| Aromatic oil |  | 7.5 | 7.5 | 37.5 |  |
| Sodium hydrogencarbonate | 2.0 | 2.0 | 2.0 | 2.0 | 2.0 |
| E* @50° C. | 231 | 230 | 233 | 243 | 215 |
| E* @90° C. | 121 | 123 | 126 | 123 | 116 |
| E* @90° C./E* @50° C. | 0.52 | 0.53 | 0.54 | 0.51 | 0.54 |
| Chemicals dispersibility | good | good | good | good | good |
| Steering stability and response property of actual car | 110 | 108 | 109 | 110 | 105 |
| Grip limit height of actual car | 97 | 98 | 98 | 108 | 97 |

*1 average particle size: 18 nm
*2 average particle size: 22 nm
*3 average particle size: 28 nm

EXAMPLES 13 to 23

Rubber compositions of tire tread were prepared in the same manner as in Example 1 by using the same blend as that of Example 2 except that sodium hydrogencarbonate was changed to the sodium-containing compounds as shown in Table 5. Steel radial tires were made in the same manner as in Example 1 by using these rubber compositions of tire tread.

The same tests as in Example 1 were carried out with respect to the resulting rubber compositions of tire tread and tires. The results are shown in Table 5.

TABLE 5

|  | Example 13 | Example 14 | Example 15 | Example 16 | Example 17 | Example 18 |
|---|---|---|---|---|---|---|
| SBR (A) | 137.5 | 137.5 | 137.5 | 137.5 | 137.5 | 137.5 |
| Carbon black N110 | 80.0 | 80.0 | 80.0 | 80.0 | 80.0 | 80.0 |
| Sodium polyphosphate | 2.0 | | | | | |
| Sodium metaphosphate | | 2.0 | | | | |
| Sodium acetate | | | 2.0 | | | |
| Sodium butyrate | | | | 2.0 | | |
| Sodium propionate | | | | | | |
| Sodium benzoate | | | | | | 2.0 |
| Sodium oleate | | | | | | |
| Sodium alginate | | | | | | |
| Sodium carboxymethyl cellulose | | | | | | |
| $E^*$ @50° C. | 217 | 228 | 225 | 226 | 224 | 221 |
| $E^*$ @90° C. | 109 | 120 | 126 | 130 | 131 | 121 |
| $E^*$ @90° C./$E^*$ @50° C. | 0.50 | 0.53 | 0.56 | 0.58 | 0.58 | 0.55 |
| Chemicals dispersibility | permissible | permissible | good | good | good | good |
| Steering stability and response property of actual car | 105 | 109 | 110 | 110 | 111 | 108 |
| Grip limit height of actual car | 101 | 103 | 104 | 104 | 105 | 101 |

|  | Example 19 | Example 20 | Example 21 | Example 22 | Example 23 |
|---|---|---|---|---|---|
| SBR (A) | 137.5 | 137.5 | 137.5 | 137.5 | 137.5 |
| Carbon black N110 | 80.0 | 80.0 | 80.0 | 80.0 | 80.0 |
| Sodium polyphosphate | | | | | |
| Sodium metaphosphate | | | | 1.0 | |
| Sodium acetate | | | | 1.0 | 1.0 |
| Sodium butyrate | | | | | |
| Sodium propionate | | | | | |
| Sodium benzoate | | | | | |
| Sodium oleate | 2.0 | | | | 1.0 |
| Sodium alginate | | 2.0 | | | |
| Sodium carboxymethyl cellulose | | | 2.0 | | |
| $E^*$ @50° C. | 215 | 220 | 220 | 225 | 219 |
| $E^*$ @90° C. | 114 | 117 | 120 | 121 | 118 |
| $E^*$ @90° C./$E^*$ @50° C. | 0.53 | 0.53 | 0.55 | 0.54 | 0.54 |
| Chemicals dispersibility | good | good | good | permissible | permissible |
| Steering stability and response property of actual car | 108 | 108 | 110 | 108 | 109 |
| Grip limit height of actual car | 100 | 101 | 102 | 102 | 101 |

As is clear from Table 1, when sodium hydrogencarbonate is not contained in the rubber composition, or blending amount is less than 0.5 part, viscoelasticity at 9° C. is low, and when the blending amount is more than 5 parts, chemicals dispersibility is bad. As is clear from Table 2, when emulsion-polymerized SBR with a bonded styrene content of not less than 40% is not contained in the rubber composition, grip limit height of the actual car is worse. As is clear from Table 3, when the inorganic compound does not contain sodium, or the inorganic compound is not an appropriate compound even if it contains sodium, viscoelasticity at 90° C. is low. As is clear from Table 4, when not less than 70 parts of a carbon black having an average particle size of not more than 25 nm is contained in the rubber composition, grip limit height of the actual car is not worse and steering stability and response property are excellent. As is clear from Table 5, when a basic sodium salt of organic acid is used, viscoelasticities at 50° C. and 90° C. are especially high and chemicals dispersibility is also excellent.

When the rubber composition of tire tread of the present invention is used, safe driving at a high speed can be realized, since a lowering of the rigidity of the tread part due to heat generation of the tread is small, steering stability and response property of the actual car are excellent, and grip limit height of the actual car is high.

What I claim is:

1. A tire tread, which contains a rubber composition comprising:
   an emulsion-polymerized styrene-butadiene rubber with a bonded styrene content of not less than 40% by weight, which is contained in an amount of 10 to 100% by weight in a rubber component, and
   sodium propionate which is blended in an amount of 0.5 to 5.0 parts by weight per 100 parts by weight of the rubber component.

2. The tire tread of claim 1, wherein said tire tread is used for a high performance tire of sports cars.

3. The tire tread of claim 1, wherein a carbon black having an average particle size of not more than 25 nm is blended in an amount of not less than 70 parts by weight per 100 parts by weight of the rubber component.

4. The tire tread of claim 1, wherein the emulsion-polymerized styrene-butadiene rubber is present in the rubber composition in an amount of 20 to 100% by weight of the rubber component.

5. The tire tread of claim 1, wherein the emulsion-polymerized styrene-butadiene rubber is present in the rubber composition in an amount of 50 to 100% by weight of the rubber component.

6. The tire tread of claim 1, wherein the emulsion-polymerized styrene-butadiene rubber has a bonded styrene content of 40 to 50% by weight.

7. The tire tread of claim 1, wherein the emulsion-polymerized styrene-butadiene rubber is present in the rubber composition in an amount of 20 to 100% by weight of the rubber component, and wherein the emulsion-polymerized styrene-butadiene rubber has a bonded styrene content of 40 to 50% by weight.

8. The tire tread of claim 1, wherein the emulsion-polymerized styrene-butadiene rubber is present in the rubber composition in an amount of 50 to 100% by weight of the rubber component, and wherein the emulsion-polymerized styrene-butadiene rubber has a bonded styrene content of 40 to 50% by weight.

9. The tire tread of claim 1, wherein the rubber composition contains at least one of a sodium-containing basic inorganic compound and a basic sodium salt of an organic acid other than sodium propionate.

10. The tire tread of claim 9, wherein at least one of the sodium-containing basic inorganic compound and the basic sodium salt of the organic acid is blended in an amount of 1.0 to 4.0 parts per 100 parts of the rubber component.

11. The tire tread of claim 9, wherein the sodium-containing basic inorganic compound and the basic sodium salt of the organic acid are basic compounds which have a pH of approximately 9 to 14 when placed in a 1N aqueous solution.

12. The tire tread of claim 9, wherein the sodium-containing basic inorganic compound is present in the composition and is selected from the group consisting of sodium hydrogen-carbonate, anhydrous sodium carbonate, sodium hydroxide, sodium polyphosphate, sodium metaphosphate, and mixtures thereof.

13. The tire tread of claim 9, wherein the sodium-containing basic inorganic compound is present in the composition and is sodium hydrogencarbonate.

14. The tire tread of claim 9, wherein the basic sodium salt of the organic acid other than sodium propionate is present in the composition and is selected from the group consisting of sodium acetate, sodium butyrate, sodium benzoate, sodium oleate, sodium alginate, sodium carboxymethyl cellulose, and mixtures thereof.

15. A tire, which comprises the tire tread of claim 1.

16. The tire of claim 15, wherein said tire is used for sports cars.

* * * * *